United States Patent [19]
Arai et al.

[11] Patent Number: 5,771,007
[45] Date of Patent: Jun. 23, 1998

[54] AUTO-CRUISE SYSTEM FOR VEHICLE

[75] Inventors: Toshiaki Arai; Yasuhiko Fujita, both of Wako, Japan

[73] Assignee: Honda Giken Kogyo Kabushiki Kaisha, Tokyo, Japan

[21] Appl. No.: 755,469

[22] Filed: Nov. 22, 1996

[30] Foreign Application Priority Data

Nov. 24, 1995 [JP] Japan ................................. 7-305522

[51] Int. Cl.$^6$ ................................................. G08G 1/16
[52] U.S. Cl. .......................... 340/903; 340/435; 180/170; 180/169; 364/426.044; 364/461
[58] Field of Search ................................ 340/903, 435, 340/436, 440, 465; 180/169, 170, 167; 364/461, 426.01, 426.06, 426.044

[56] References Cited

U.S. PATENT DOCUMENTS

| | | | |
|---|---|---|---|
| 4,621,705 | 11/1986 | Etoh | 180/169 |
| 4,622,636 | 11/1986 | Tachibana | 364/424 |
| 4,670,845 | 6/1987 | Etoh | 364/461 |
| 5,529,139 | 6/1996 | Kurahashi et al. | 180/169 |

*Primary Examiner*—Jeffery Hofsass
*Assistant Examiner*—Sihong Huang
*Attorney, Agent, or Firm*—Nikaido, Marmelstein, Murray & Oram LLP

[57] ABSTRACT

In an auto-cruise system for a vehicle, when a distance detected by a distance detecting device becomes shorter than a reference distance based on a value detected by a vehicle speed detecting device, a speed reducing command signal is output from a distance regulating device. A travel speed control device is capable of being switched over among a cruise speed control mode for controlling the vehicle speed such that a vehicle speed is equalized to a vehicle speed set by a speed setting device upon non-outputting of a speed reducing command signal, a speed reducing control mode for reducing the vehicle speed upon outputting of the speed reducing command signal, and a speed increasing control mode for increasing the vehicle speed until it is restored to the set vehicle speed in response to the disappearing of the speed reducing command signal. In the speed increasing control mode of the travel speed control device, the acceleration until the restoration of the vehicle speed to the set vehicle speed is set such that it is lowered as the turning state detected by a turning state detecting device is enlarged. Thus, the restoration to the set vehicle speed after speed-reduction can be smoothed to ensure that a driver does not feel a discomfort or a sense of incompatibility.

2 Claims, 4 Drawing Sheets

AUTO-CRUISE SYSTEM FOR VEHICLE

BACKGROUND OF THE INVENTION

1. Field of the Invention

The present invention relates to an auto-cruise system for a vehicle, including: a vehicle speed detecting means for detecting a vehicle speed of a subject vehicle; an actuator adapted to change the subject vehicle speed; a speed setting means for setting the vehicle speed at any value; a distance detecting means for detecting a distance between the subject vehicle and an object ahead of the subject vehicle; a distance regulating means for outputting a speed-reducing command signal when the distance detected by the distance detecting means becomes shorter than a reference distance determined based on the detection value detected by the vehicle speed detecting means; and a travel speed control means for controlling the operation of the actuator, which is capable of switching over among 1) a cruise speed control mode for controlling the vehicle speed, such that the detection value detected by the vehicle speed detecting means is equalized to a vehicle speed set by the speed setting means when the speed reducing command signal has not been output from the distance regulating means, 2) a speed reducing control mode for reducing the vehicle speed when the speed reducing command signal has been output from the distance regulating means, and 3) a speed increasing control mode for increasing the vehicle speed until it is restored to the set vehicle speed in response to the disappearing of the speed reducing command signal output from the distance regulating means, wherein the auto-cruise system further includes a turning state detecting means for detecting a turning state of the vehicle, and in the speed increasing mode of the travel speed control means, the acceleration until the vehicle speed is restored to the set vehicle speed is set such that it becomes lower as the turning state detected by the turning state detecting means becomes larger.

2. Description of the Related Art

Such conventional auto-cruise system is designed such that the actuators are usually controlled so as to maintain the vehicle speed set in the speed setting means, but when a vehicle traveling at a speed lower than that of the subject vehicle has been detected ahead of the subject vehicle, the actuators are controlled so as to reduce the vehicle speed, and when such a detected vehicle ahead of the subject vehicle is disappeared, the actuators are controlled so as to increase the vehicle speed to restore to the set vehicle speed.

In the above conventional system, the restoration of the vehicle speed to the set vehicle speed is carried out at a constant acceleration when the subject vehicle is traveling on a road other than a corner. This is because of a lower probability the system can detect a preceding vehicle by the distance detecting means during traveling of the subject vehicle at a corner due to the fact that the detection angle of the distance detecting means is limited. When the turning angle of the vehicle is in a range of the maximum detection angle of the distance detecting means, the vehicle speed is restored at a constant acceleration, but during turning of the vehicle at a turning angle exceeding the maximum detected value of the distance detection angle, the vehicle is not accelerated.

However, the radius of a corner of a travel road is generally gentle in the vicinity of its entrance and exit but steep at its intermediate portion, and even if the radius of a corner is constant, the driver does not maintain the steering angle constant but delicately changes the steering angle. Therefore, if the speed increasing area and a speed non-increasing area (a vehicle speed maintaining area) are distinctly separated from each other in accordance with the turning angle of the vehicle, as described above, the speed-increasing may be produced or stopped during turning of the vehicle, resulting in a ununiform state to give an discomfort to the driver. In the speed increasing area, the vehicle is restored to the set vehicle speed at a constant acceleration irrespective of the turning state of the vehicle, thereby providing a sense of incompatibility.

SUMMARY OF THE INVENTION

Accordingly, it is an object of the present invention to provide an auto-cruise system for a vehicle, wherein a restoration to the set vehicle speed after speed-reduction is smoothed to give no discomfort or no sense of to a driver.

To achieve the above object, according to a first aspect and feature of the present invention, there is provided an auto-cruise system for a vehicle, comprising: a vehicle speed detecting means for detecting a vehicle speed of a subject vehicle; an actuator adapted to change the subject vehicle speed; a speed setting means for setting the vehicle speed at a desired value; a distance detecting means for detecting a distance between the subject vehicle and an object ahead of the subject vehicle; a distance regulating means for outputting a speed-reducing command signal when the distance detected by the distance detecting means becomes shorter than a reference distance determined based on a detection value detected by the vehicle speed detecting means; and a travel speed control means for controlling the operation of the actuator, which is capable of switching over among 1) a cruise speed control mode for controlling the vehicle speed, such that the detection value detected by the vehicle speed detecting means is equalized to a vehicle speed set by the speed setting means when the speed reducing command signal has not been output from the distance regulating means, 2) a speed reducing control mode for reducing the vehicle speed when the speed-reducing command signal has been output from the distance regulating means, and 3) a speed increasing control mode for increasing the vehicle speed until it is restored to the set vehicle speed in response to the disappearing of the speed-reducing command signal output from the distance regulating means, wherein the auto-cruise system further includes a turning state detecting means for detecting a turning state of the vehicle, and in the speed increasing control mode of the travel speed control means, an acceleration until the vehicle speed is restored to the set vehicle speed is set such that it becomes lower as the turning state detected by the turning state detecting means becomes larger.

With the first feature of the present invention, during restoration to the original set vehicle speed, the vehicle speed is increased at an acceleration depending upon the turning state of the vehicle. Even if the radius of a corner of a travel road is slightly varied, or even if the steering angle provided by the driver is delicately changed, the variation in acceleration can be decreased to achieve a smooth restoration to the set vehicle speed to ensure that the driver does not feel a discomfort or a sense of incompatibility.

According to a second aspect and feature of the present invention, in addition to the first feature, the turning state detecting means is arranged to detect an angle of advancement of the vehicle, and the acceleration in the speed increasing control mode of the travel speed control means is set such that it is continuously varied between "0" at the time when the advancement angle detected by the turning state detecting means corresponds to the maximum detection angle of the distance detecting means or more, and a maximum value at the time when the advancement angle detected by the turning state detecting means corresponds to a substantially straight advancing state.

The above and other objects, features and advantages of the invention will become apparent from the following description of a preferred embodiment taken in conjunction with the accompanying drawings.

DETAILED DESCIPTION OF THE PREFERRED EMBODIMENT

The present invention will now be described by way of a preferred embodiment with reference to the accompanying drawings.

Figure 1:
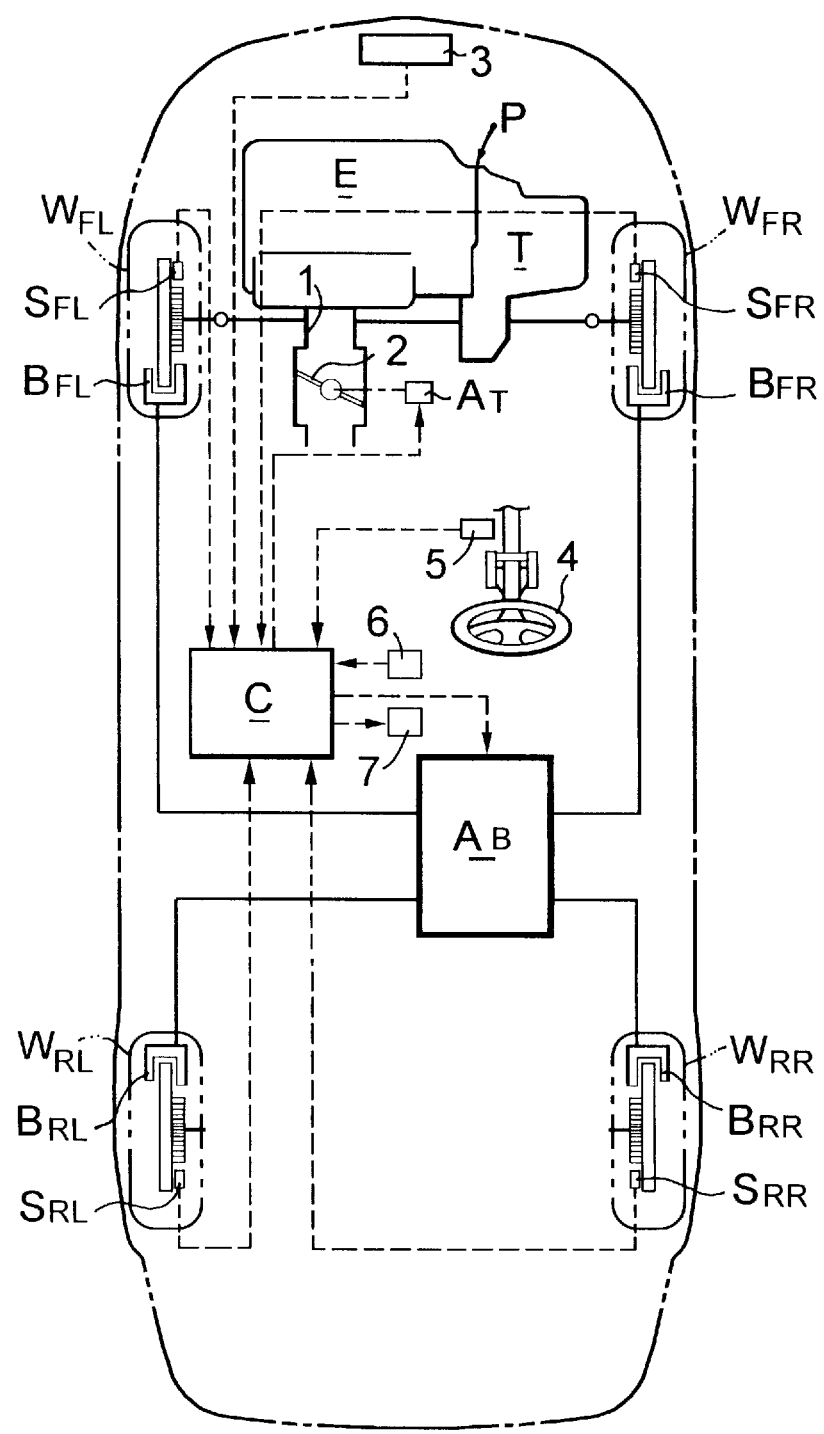
FIG. 1 is a diagrammatic illustration of a drive system and a brake system of a vehicle.

Referring first to FIG. 1, a power unit P including an engine E and a transmission T is mounted at a front portion of an automotive vehicle as a subject vehicle, such that a driving force from the power unit P is transmitted through a differential D to a left front wheel $W_{FL}$ and a right front wheel $W_{FR}$. Moreover, left and right front wheel brakes $B_{FL}$ and $B_{FR}$ are mounted on the left and right front wheels $W_{FL}$ and $W_{FR}$, and left and right rear wheel brakes $B_{RL}$ and $B_{RR}$ are mounted on left and right rear wheels $W_{RL}$ and $W_{RR}$, respectively.

Braking fluid pressures for the wheel brakes $B_{FL}$, $B_{FR}$, $B_{RL}$ and $B_{RR}$ are regulated by a brake actuator $A_B$, and the vehicle speed can be varied by operating the brake actuator $A_B$.

A throttle actuator $A_T$ is connected to a throttle valve 2 which is mounted in an intake passage 1 in the engine E, and the vehicle speed can be varied by operating the throttle actuator $A_T$.

The operations of the brake actuator $A_B$ and the throttle actuator $A_T$ are controlled by a controller C. The following values are input to the controller C: a detection value detected by a distance detecting means 3 for detecting a distance between the subject vehicle and an object ahead of the subject vehicle by radar or the like; a detection value detected by a steering angle sensor 5 for detecting a steering angle provided by a steering wheel or handle 4, detection values detected by wheel speed sensors $S_{FL}$, $S_{FR}$, $S_{RL}$ and $S_{RR}$ individually mounted on the wheels $W_{FL}$, $W_{FR}$, $W_{RL}$ and $W_{RR}$; and a value set by a speed setting means 6 for setting a vehicle speed at any value by a driver. The controller C controls the operations of the brake actuator $A_B$ and the throttle actuator $A_T$ based on input signals from the distance detecting means 3, the steering angle sensor 5, the wheel speed sensors $S_{FL}$, $S_{FR}$, $S_{RL}$ and $S_{RR}$ and the speed setting means 6, and also controls the operation of a warning device or alarm such as speaker.

Figure 2:
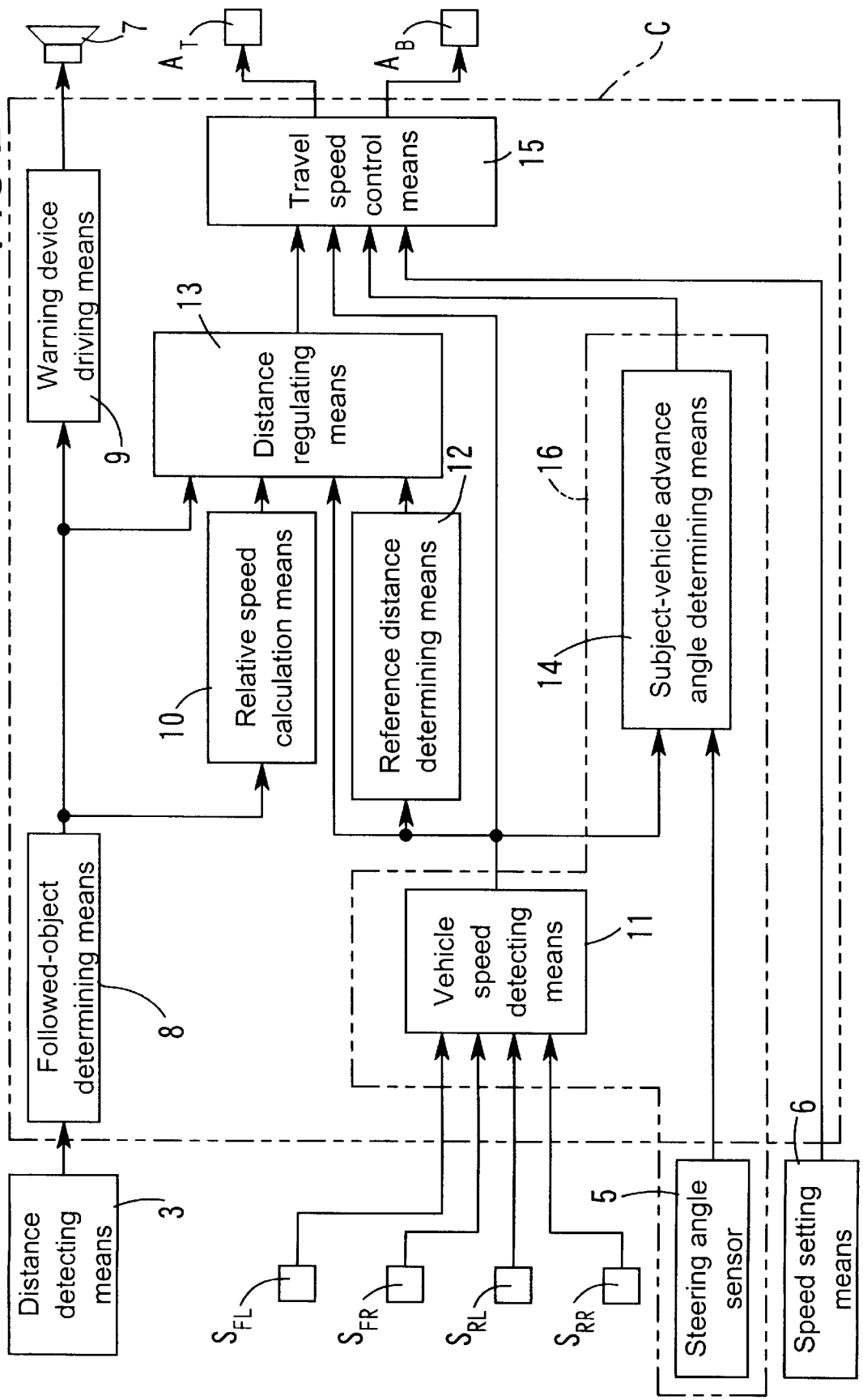
FIG. 2 is a block diagram illustrating the arrangement of an auto-cruise system.

Referring to FIG. 2, the controller C includes a followed-object determining means 8, a warning device driving means 9, a relative speed calculating means 10, a vehicle speed detecting means 11, a reference distance determining means 12, a distance regulating means 13, a subject-vehicle advance angle determining means 14 and a travel speed control means 15.

The followed-object determining means 8 determines a vehicle among the objects detected by the distance detecting means 3 which is traveling ahead of the subject vehicle, based on a time variation in detection value detected by the distance detecting means 3. When the followed-object is determined by the followed-object determining means 8, a signal from the followed-object determining means 8 is applied to the warning device driving means 9, thereby operating the warning device 7 such as the speaker by the warning device driving means 9 to inform a driver of the fact that there is a vehicle ahead of the subject vehicle to call a driver's attention.

Figure 3:
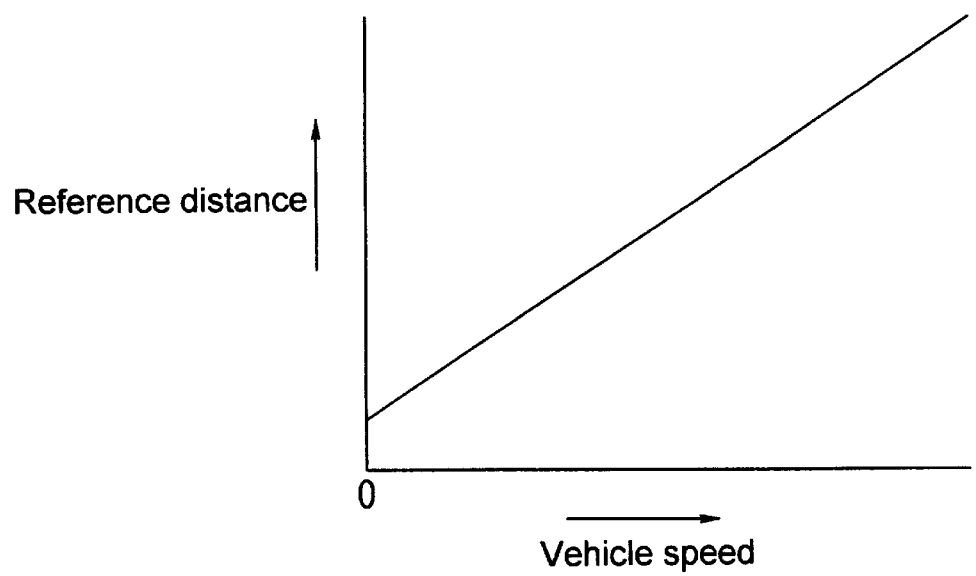
FIG. 3 shows the set value of a reference distance depending upon the vehicle speed.

In the relative speed calculating means 10, a relative speed of a preceding vehicle is calculated based on a time variation in distance between the subject vehicle and the preceding vehicle determined as a vehicle which the subject vehicle should follow, by the followed-object determining means 8. The detection values detected by the wheel speed sensors $S_{FL}$, $S_{FR}$, $S_{RL}$ and $S_{RR}$ are input to the vehicle speed detecting means 11, and the vehicle speed detecting means 11 calculates a vehicle speed of the subject vehicle based on the detection values detected by the wheel speed sensors $S_{FL}$, $S_{FR}$, $S_{RL}$ and $S_{RR}$. Further, the vehicle speed detected by the vehicle speed detecting means is input to the reference distance determining means 12, and in the reference distance determining means 12, a reference distance previously set in accordance with the vehicle speed as shown in FIG. 3 is determined. In FIG. 3, the reference distance at the time when the vehicle speed is "0" is a distance by which the subject vehicle should be spaced apart from the preceding vehicle when the vehicle has been stopped.

Input to the distance regulating means 13 are the distance from the subject vehicle to the preceding vehicle determined as a vehicle which the subject vehicle should follow, by the followed-object determining means 8, the relative speed of the preceding vehicle determined by the relative speed calculating means 10, the vehicle speed of the subject vehicle detected by the vehicle speed detecting means 11, and the reference distance determined by the reference distance determining means 12. In the distance regulating means 13, a regulated vehicle speed is calculated according to the following equation:

Regulated vehicle speed=vehicle speed of preceding vehicle+a× (actual distance−reference distance)=(vehicle speed of subject vehicle+relative speed)+a×(actual distance−reference distance)

wherein $a$ is a plus constant; and a×(actual distance−reference distance) assumes a minus value when the distance from the subject vehicle to the preceding vehicle is smaller than the reference distance. That is, when the distance detected by the distance detecting means 3 is shorter than the reference distance determined based on the detection value detected by the vehicle speed detecting means 11, the regulated vehicle speed is set lower than the vehicle speed of the preceding vehicle, such that the vehicle speed of the subject vehicle speed is reduced. In this case, a speed-reducing command signal is output from the distance regulating means 13.

The subject-vehicle advance angle determining means 14 constitutes a turning-state detecting means 16 together with the steering angle sensor 5 and the vehicle speed detecting means 11, and detects an advance angle of the subject vehicle based on the steering angle detected by the steering angle sensor 5 and the vehicle speed detected by the vehicle speed detecting means 11.

Signals from the speed setting means 6, the vehicle speed detecting means 11, the distance regulating means 13 and the subject-vehicle advance angle determining means 14 are input to the travel speed control means 15. The travel speed control means 15 controls the operations of the brake actuator $A_B$ and the throttle actuator $A_T$ based on the signals input from the speed setting means 6, the vehicle speed detecting means 11, the distance regulating means 13 and the subject-vehicle advance angle determining means 14.

The travel speed control means 15 is capable of being switched over between a cruise speed control mode for controlling the vehicle speed such that the detection value detected by the vehicle speed detecting means 11 is equalized to the vehicle speed set in the speed setting means 6 in a state in which the speed-reducing command signal is not output from the distance regulating means 13, a speed-reducing mode for reducing the vehicle speed to the regulated vehicle speed calculated in the distance regulating means 13 when the speed-reducing command signal has been output from the distance regulating means 13, and a speed-increasing mode for increasing the vehicle speed until the vehicle speed is restored to the set vehicle speed in response to the disappearing of the speed reducing command signal output from the distance regulating means 13.

Figure 4:
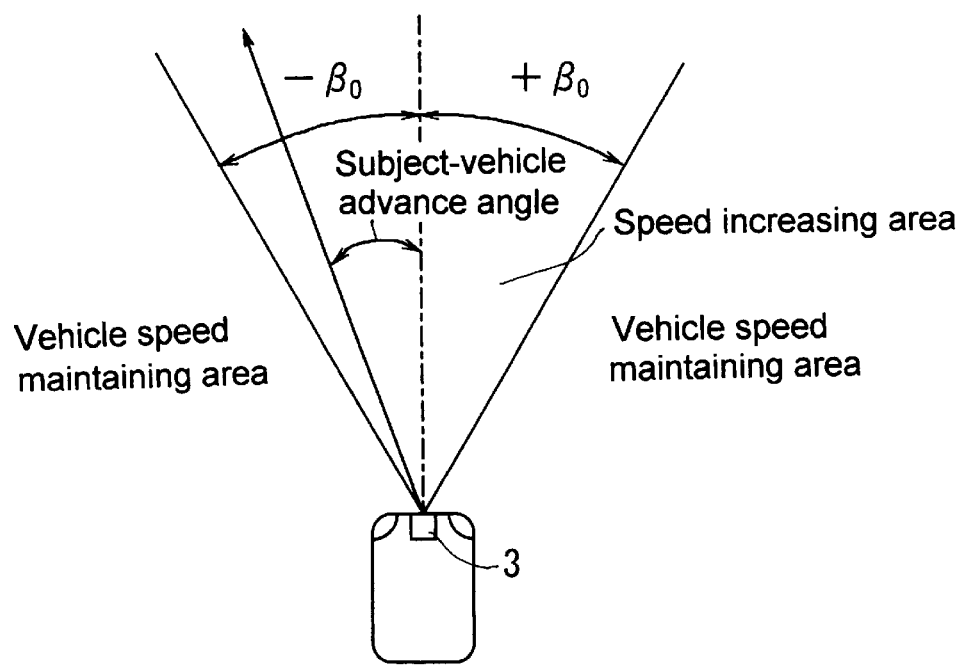
FIG. 4 is a diagram for explaining the detection angle of a distance detecting means and the angle of advancement of the subject vehicle.
Figure 5:
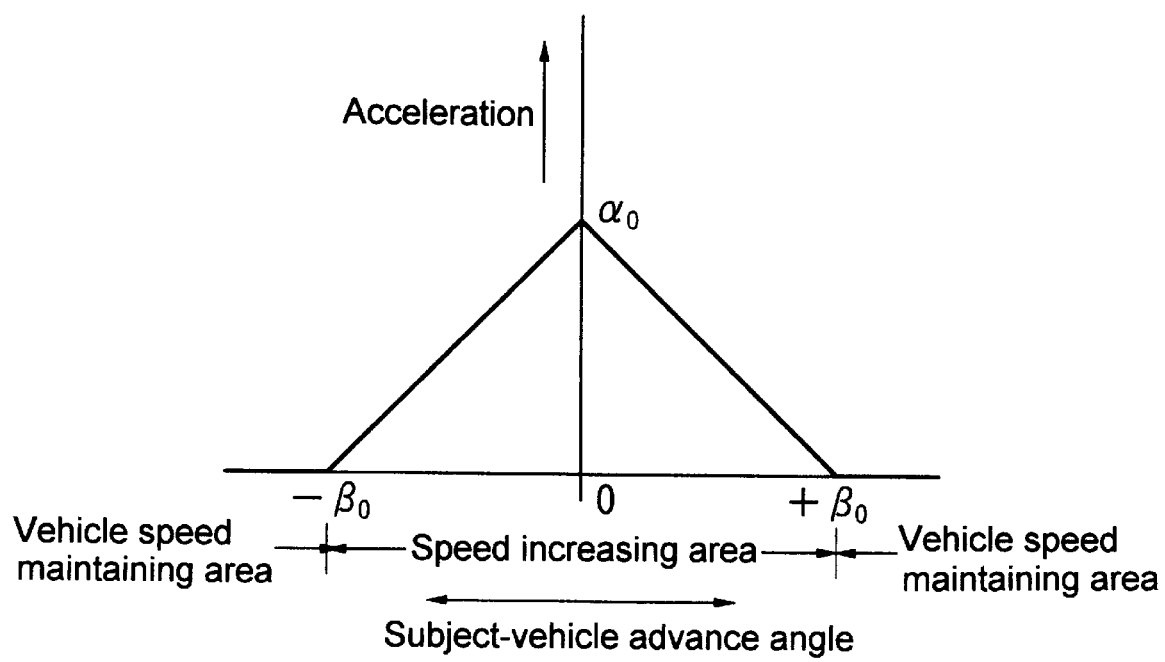
FIG. 5 shows the relationship between the angle of advancement of the subject vehicle and the acceleration.

In the speed increasing mode, when the maximum angle detected by the distance detecting means 3 is $\beta_0$ rightwards (in a plus direction) and leftwards (in a minus direction), respectively, as shown in FIG. 4, an area in which the advance angle of the subject vehicle is equal to or larger than $\beta_0$ rightwards and leftwards, respectively, is established as a vehicle speed maintaining area, while an area in which the advance angle of the subject vehicle is smaller than $\beta_0$ rightwards and leftwards, respectively, is established as a speed increasing area. An acceleration $\alpha$ in the speed increasing area is determined in accordance with the advance angle detected by the subject-vehicle advance angle determining means 14 of the turning-state detecting means 16, as shown in FIG. 5. That is, the acceleration $\alpha$ is set such that it is continuously varied between "0" at the time when the advance angle of the subject vehicle is equal to or larger than the maximum angle $\beta_0$ detected by the distance detecting means 3 (in the vehicle speed maintaining area) and the maximum value $\alpha_0$ at the time when the advance angle of the subject vehicle indicates a substantially straight advancement.

The maximum value $\alpha_0$ of the acceleration $\alpha$ is set at about an acceleration exhibited upon the continuous depression of a restoring button in a conventional cruising system, which operates to equalize a vehicle speed to a value set by the driver.

The operation of the embodiment will be described below. In a usual travel state, the brake and throttle actuators $A_B$ and $A_T$ are controlled by the travel control means 15, such that the vehicle speed set in the speed setting means 6 is maintained. However, when a vehicle traveling at a speed lower than that of the subject vehicle has been found ahead of the subject vehicle based on the result of detection of the distance to the object ahead of the subject vehicle by the distance detecting means 3, the speed-reducing command signal is output from the distance regulating means 13, and in response thereto, the brake and throttle actuators $A_B$ and $A_T$ are controlled by the travel control means 15, such that the vehicle speed is reduced. Therefore, even if there is a vehicle traveling at a lower speed ahead of the subject vehicle, the subject vehicle is reliably prevented from colliding against such preceding vehicle.

If the advance angle of the subject vehicle is in the speed increasing area (see FIG. 4) when there is no vehicle traveling at a lower speed ahead of the subject vehicle, i.e., when the speed reducing command signal from the distance regulating means 13 disappears, the vehicle speed is regulated such that it is restored to the original set vehicle speed at the acceleration $\alpha$ determined depending upon the advance angle. Moreover, the acceleration $\alpha$ is set such that it is continuously varied between "0" at the time when the advance angle of the subject vehicle is equal to or larger than the maximum angle $\beta_0$ detected by the distance detecting means 3 (in the vehicle speed maintaining area) and the maximum value $\alpha_0$ at the time when the advance angle of the subject vehicle indicates the substantially straight advancement. Therefore, when the probability the system can detect the preceding vehicle by the distance detecting means 3 during traveling of the vehicle at a corner is low, the vehicle speed can be maintained without being increased, thereby eliminating the possibility of the collision of the subject vehicle against another vehicle due to the sudden emergence of the other vehicle ahead of the subject vehicle. Even if the radius of a corner of a travel road is changed in the middle, or the steering angle provided by the driver is delicately varied, a discomfort cannot be provided to the driver by the speed increasing or by the stopping of the speed increasing. Further, the speed increasing corresponding to the turning state is performed and hence, the driver cannot feel a sense of incompatibility.

Although the embodiment of the present invention has been described in detail, it will be understood that the present invention is not limited to the above-described embodiment, and various modifications may be made without departing from the spirit and scope of the invention defined in claims.

For example, the turning state of the vehicle may be determined by detecting a yaw rate, or by determining a difference between the wheel speeds of the follower wheels, or based on values detected by a pair of lateral acceleration sensors placed at front and rear portions of the vehicle.

What is claimed is:

1. An auto-cruise system for a vehicle, comprising: a vehicle speed detecting means for detecting a vehicle speed of a subject vehicle; an actuator adapted to change the subject vehicle speed; a speed setting means for setting the vehicle speed at a desired value; a distance detecting means for detecting a distance between the subject vehicle and an object ahead of the subject vehicle; a distance regulating means for outputting a speed-reducing command signal when the distance detected by said distance detecting means becomes shorter than a reference distance determined based on a detection value detected by said vehicle speed detecting means; and a travel speed control means for controlling the operation of said actuator, which is capable of switching over among 1) a cruise speed control mode for controlling the vehicle speed, such that the detection value detected by said vehicle speed detecting means is equalized to a vehicle speed set by said speed setting means when the speed reducing command signal has not been output from said distance regulating means, 2) a speed reducing control mode for reducing the vehicle speed when the speed-reducing command signal has been output from said distance regulating means, and 3) a speed increasing control mode for increasing the vehicle speed until it is restored to the set vehicle speed in response to the disappearing of the speed-reducing command signal output from said distance regulating means, wherein said auto-cruise system further includes a turning state detecting means for detecting a turning state of the vehicle, and in said speed increasing control mode of the travel speed control means, an acceleration until the vehicle speed is restored to the set vehicle speed is set such that it becomes lower as the turning state detected by the turning state detecting means becomes larger.

2. An auto-cruise system for a vehicle according to claim 1, wherein said turning state detecting means is arranged to detect an angle of advancement of the vehicle, and the acceleration in said speed increasing control mode of said travel speed control means is set such that it is continuously varied between "0" at the time when the advancement angle detected by said turning state detecting means corresponds to a maximum detection angle of said distance detecting means or more, and a maximum value at the time when the advancement angle detected by said turning state detecting means corresponds to a substantially straight advancing state.

* * * * *